US011644850B2

(12) United States Patent
Shibata

(10) Patent No.: US 11,644,850 B2
(45) Date of Patent: May 9, 2023

(54) AIRCRAFT

(71) Applicant: YAMAHA HATSUDOKI KABUSHIKI KAISHA, Iwata (JP)

(72) Inventor: Hideki Shibata, Irvine, CA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 116 days.

(21) Appl. No.: 16/649,020

(22) PCT Filed: Sep. 22, 2017

(86) PCT No.: PCT/JP2017/034310
§ 371 (c)(1),
(2) Date: Mar. 19, 2020

(87) PCT Pub. No.: WO2019/058505
PCT Pub. Date: Mar. 28, 2019

(65) Prior Publication Data
US 2020/0293066 A1 Sep. 17, 2020

(51) Int. Cl.
*G05D 1/04* (2006.01)
*A01M 9/00* (2006.01)
(Continued)

(52) U.S. Cl.
CPC ........... *G05D 1/042* (2013.01); *A01M 9/0084* (2013.01); *B64C 39/024* (2013.01); *B64D 1/18* (2013.01);
(Continued)

(58) Field of Classification Search
CPC .......... G05D 1/042; B64D 1/18; G01S 19/40; G01S 19/42; G08G 55/003
See application file for complete search history.

(56) References Cited

U.S. PATENT DOCUMENTS 10,254,767 B1 * 4/2019 Kamon ................. G06V 20/17
2016/0364991 A1 12/2016 Hayes
(Continued)

FOREIGN PATENT DOCUMENTS

JP      H11-231049 A    8/1999
JP      2002-211494 A   7/2002
(Continued)

OTHER PUBLICATIONS

International Search Report in PCT/JP2017/034310 dated Nov. 7, 2017.

*Primary Examiner* — Peter D Nolan
*Assistant Examiner* — Mikko Okechukwu Obioha
(74) *Attorney, Agent, or Firm* — Global IP Counselors, LLP

(57) ABSTRACT

An aircraft includes at least one sensor, an altitude actuator, a memory device, and an electronic controller. The at least one sensor is configured to detect altitude of the aircraft, current position of the aircraft and speed of the aircraft. The altitude actuator is configured to change the altitude of the aircraft. The memory device is configured to store predetermined terrain data of an area. The electronic controller is configured to estimate a future position of the aircraft based on a detected current position of the aircraft and a detected speed of the aircraft. The electronic controller is further configured to control the altitude actuator based on the future position, a detected altitude of the aircraft and the predetermined terrain data.

14 Claims, 11 Drawing Sheets

(51) Int. Cl.
  *B64C 39/02* (2023.01)
  *B64D 1/18* (2006.01)
  *G01S 19/40* (2010.01)
  *G01S 19/42* (2010.01)
  *G01S 19/52* (2010.01)
  *G05D 1/00* (2006.01)
  *G08G 5/00* (2006.01)
  *B64U 10/10* (2023.01)
  *B64U 101/00* (2023.01)

(52) U.S. Cl.
  CPC .............. *G01S 19/40* (2013.01); *G01S 19/42* (2013.01); *G01S 19/52* (2013.01); *G05D 1/0022* (2013.01); *G08G 5/003* (2013.01); *G08G 5/0047* (2013.01); *B64U 10/10* (2023.01); *B64U 2101/00* (2023.01); *B64U 2201/00* (2023.01); *G05D 2201/0201* (2013.01)

(56) References Cited

U.S. PATENT DOCUMENTS

| | | | |
|---|---|---|---|
| 2017/0158329 | A1 | 6/2017 | Liu et al. |
| 2017/0357273 | A1* | 12/2017 | Michini ................. G05D 1/106 |
| 2018/0314268 | A1* | 11/2018 | Tan ........................ B64C 39/024 |
| 2020/0109944 | A1* | 4/2020 | Zhang ................... B64C 39/024 |
| 2020/0398992 | A1* | 12/2020 | Morrison ................ B60L 58/32 |
| 2021/0264796 | A1* | 8/2021 | Chen ..................... G05D 1/0646 |

FOREIGN PATENT DOCUMENTS

| | | |
|---|---|---|
| JP | 2016-534468 A | 11/2016 |
| JP | 6195216 B1 | 9/2017 |
| WO | 2016033754 A1 | 3/2016 |

* cited by examiner

AIRCRAFT

CROSS-REFERENCE TO RELATED APPLICATIONS

This application is a U.S. National stage of International Application No. PCT/JP2017/034310, filed on Sep. 22, 2017.

BACKGROUND

Field of the Invention

The present invention generally relates to the field of aircraft. More specifically, the present invention relates to the field of aircraft with terrain following function.

Background Information

Recently, with the rapid development of unmanned aerial vehicle technology, unmanned aerial vehicles have been used for a wide range of industrial application, such as agricultural uses including spraying, seeding and the like.

For the agricultural uses, unmanned aerial vehicles need to fly over the ground (or crops) while maintaining a target altitude relative to the ground (or the crops). For example, for spraying, unmanned aerial vehicles preferably fly 3 to 5 meters above the ground (or 2 to 3 meters above crops). One example of a conventional autonomous flying control of an aircraft is disclosed in Japanese Patent Application Publication No. H11-231049. With such autonomous flying control, an aircraft is controlled to follow a predetermined flight path. In addition, unmanned aerial vehicles are sometimes controlled to maintain a target altitude relative to the ground by detecting the altitude relative to the ground using a ground altimeter.

SUMMARY

It has been discovered that when such an unmanned aircraft flies along a predetermined flight path over an undulating ground, such as a vineyard, many waypoints are needed to be prepared along the undulating ground together with target altitudes for the waypoint in order for the unmanned aircraft to maintain a target altitude relative to the ground.

On the other hand, if a ground altimeter is used, then it is necessary to process the range data for eliminating noise of high frequency components of the range data caused by detecting crops or protrusions of the ground from the range data of the ground altimeter. This causes the delay in detecting the altitude of the unmanned aerial vehicles. Thus, it is difficult to promptly control the altitude of the unmanned aerial vehicles based on the range data of the ground altimeter, which in turn requires extra margin in the target altitude of the unmanned aerial vehicles so as to properly navigate the unmanned aerial vehicles. Therefore, it is difficult to control the unmanned aerial vehicles based on the range data of the ground altimeter to fly over the undulating ground at desired target altitudes for various applications. For these reasons, the terrain following control using the ground altimeter is only used when the unmanned aerial vehicles fly over the ground with little undulation, such as a paddy field, or the ground with gentle undulation, or when the unmanned aerial vehicles fly over the ground at more than 10 meters, such as at 30 meters, from the ground.

Generally, the present disclosure is directed to various features of an aircraft with terrain following function.

In accordance with one aspect of the present disclosure, an aircraft includes at least one sensor, an altitude actuator, a memory device and an electronic controller. The at least one sensor detects altitude of the aircraft, current position of the aircraft and speed of the aircraft. The altitude actuator changes the altitude of the aircraft. The memory device stores predetermined terrain data of an area. The electronic controller estimates a future position of the aircraft based on a detected current position of the aircraft and a detected speed of the aircraft. The electronic controller controls the altitude actuator based on the future position, a detected altitude of the aircraft and the predetermined terrain data.

Also, other features, aspects and advantages of the disclosed aircraft will become apparent to those skilled in the field of manufacturing aircrafts from the following detailed description, which, taken in conjunction with the annexed drawings, discloses several illustrative embodiments of an aircraft with various features.

BRIEF DESCRIPTION OF THE DRAWINGS

Referring now to the attached drawings which form a part of this original disclosure.

Figure 1:
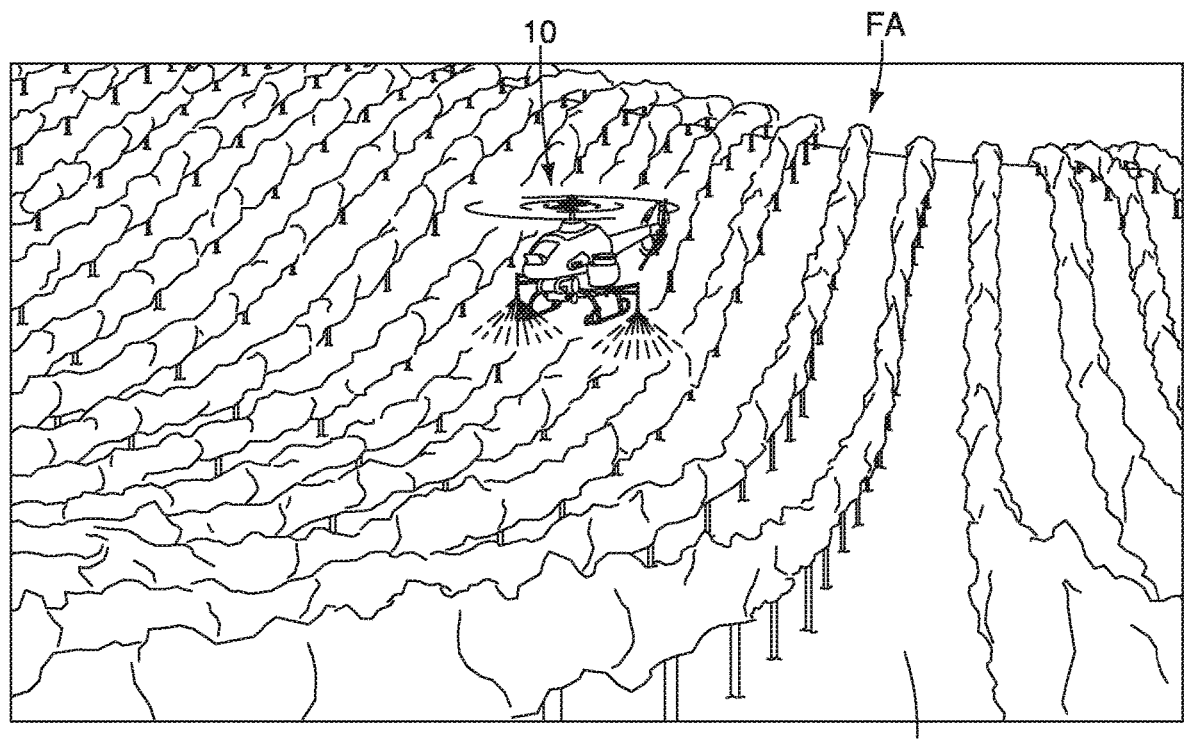
FIG. 1 is a perspective view of an unmanned helicopter in accordance with one embodiment, illustrating the unmanned helicopter flying over a vineyard under a terrain following control.

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, an unmanned helicopter 10 (e.g., an aircraft) is illustrated in accordance with one embodiment. As illustrated in FIG. 1, the unmanned helicopter 10 flies over a ground GD within a prescribed flight area FA to spray agricultural materials, such as chemicals, fertilizers and seeds, for crops. Specifically, the unmanned helicopter 10 has a terrain following function that performs a terrain following control (described later) to maintain the altitude of the unmanned helicopter 10 relative to a surface of the ground GD at a predetermined target altitude Sz (e.g., a target altitude). In the illustrated embodiment, the predetermined target altitude Sz is set to 3 meters, for example. However, the predetermined target altitude Sz can be set to different value, as needed and/or desired. In the illustrated embodiment, the unmanned helicopter 10 is used for agricultural uses. However, the unmanned helicopter 10 can also be used for a wide range of industrial application other than the agricultural uses. Also, in the illustrated embodiment, the unmanned helicopter 10 is an example of an aircraft or an unmanned aerial vehicle (UAV) with the terrain following function. However, of course, the terrain following function of the present disclosure can be provided to an airplane. The unmanned helicopter 10 generally has similar physical components to a manned helicopter, except for the absence of the cockpit area and windows and except for the size. Also, the unmanned helicopter 10 has a different control systems than the manned helicopter.

Figure 2:
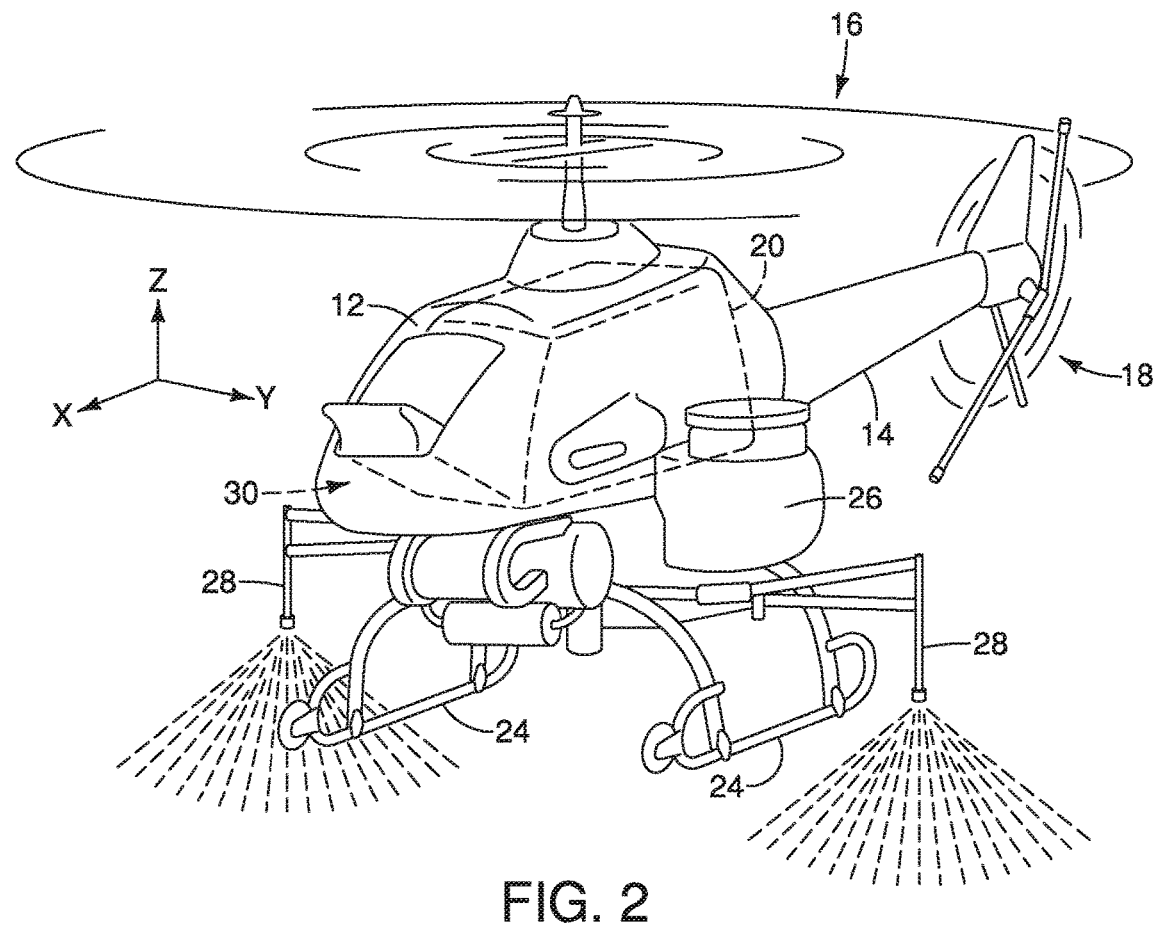
FIG. 2 is a perspective view of the unmanned helicopter illustrated in FIG. 1.

As illustrated in FIG. 2, the unmanned helicopter 10 includes a main body 12 and a tail body 14. The tail body 14 is coupled to a rear end of the main body 12. The unmanned helicopter 10 also includes a main rotor 16 rotatably provided at an upper part of the main body 12 and a tail rotor 18 rotatably provided at a rear part of the tail body 14. In the illustrated embodiment, the unmanned helicopter 10 is a rotorcraft with a single main rotor. However, the unmanned helicopter 10 can be a rotorcraft with at least two main rotors.

The unmanned helicopter 10 also has conventional physical configurations. Specifically, the unmanned helicopter 10 has an internal combustion engine 20 (hereinafter "the engine 20"), an intake system, an exhaust system and a fuel tank within the man body 12. Also, the unmanned helicopter 10 has a plurality of (five in this embodiment) servos 22 (see FIG. 3), with three of them connected to a swashplate (not shown) via linkages to change the pitch (angle) of main blades of the main rotor 16 (i.e., an aileron servo, an elevator servo and a pitch servo), one of them connected to tail blades of the tail rotor 18 via a linkage to change the pitch (angle) of the tail blades of the tail rotor 18 (i.e., a rudder servo) and one of them connected to the engine 20 via a linkage to control the throttle of the engine 20 (i.e., a throttle servo). Furthermore, the unmanned helicopter 10 has a pair of skids 24 provided via support legs at the left and right sides of the main body 12. Also, in the illustrated embodiment, the unmanned helicopter 10 has a pair of cassette-style liquid tanks 26 (e.g., at least one crop dusting tank) and a pair of spray nozzles 28 fluidly connected to the liquid tanks 26. The liquid tanks 26 holds the agricultural material, such as chemicals, fertilizers and the like, for crops. The spray nozzles 28 spray the agricultural material. Of course, instead of the liquid tanks 26 and the spray nozzles 28, the unmanned helicopter 10 can have other equipment for agricultural application, such as a granular sprayer for spraying seeds, or other equipment for industrial application, such as various sensors and detectors. Also, in the illustrated embodiment, the unmanned helicopter 10 includes the engine 20. Of course, instead of the engine 20, the unmanned helicopter 10 can have another type of a prime mover, such as an electric motor. The unmanned helicopter 10 can also include various conventional components. These physical configurations of the unmanned helicopter 10 are relatively conventional, and thus will not be described in detail for the sake of brevity. Thus, in the illustrated embodiment, the unmanned helicopter 10 includes the servos 22 (e.g., the aileron servo, the elevator servo, the pitch servo and the throttle servo) configured to change the altitude of the unmanned helicopter 10.

Figure 3:
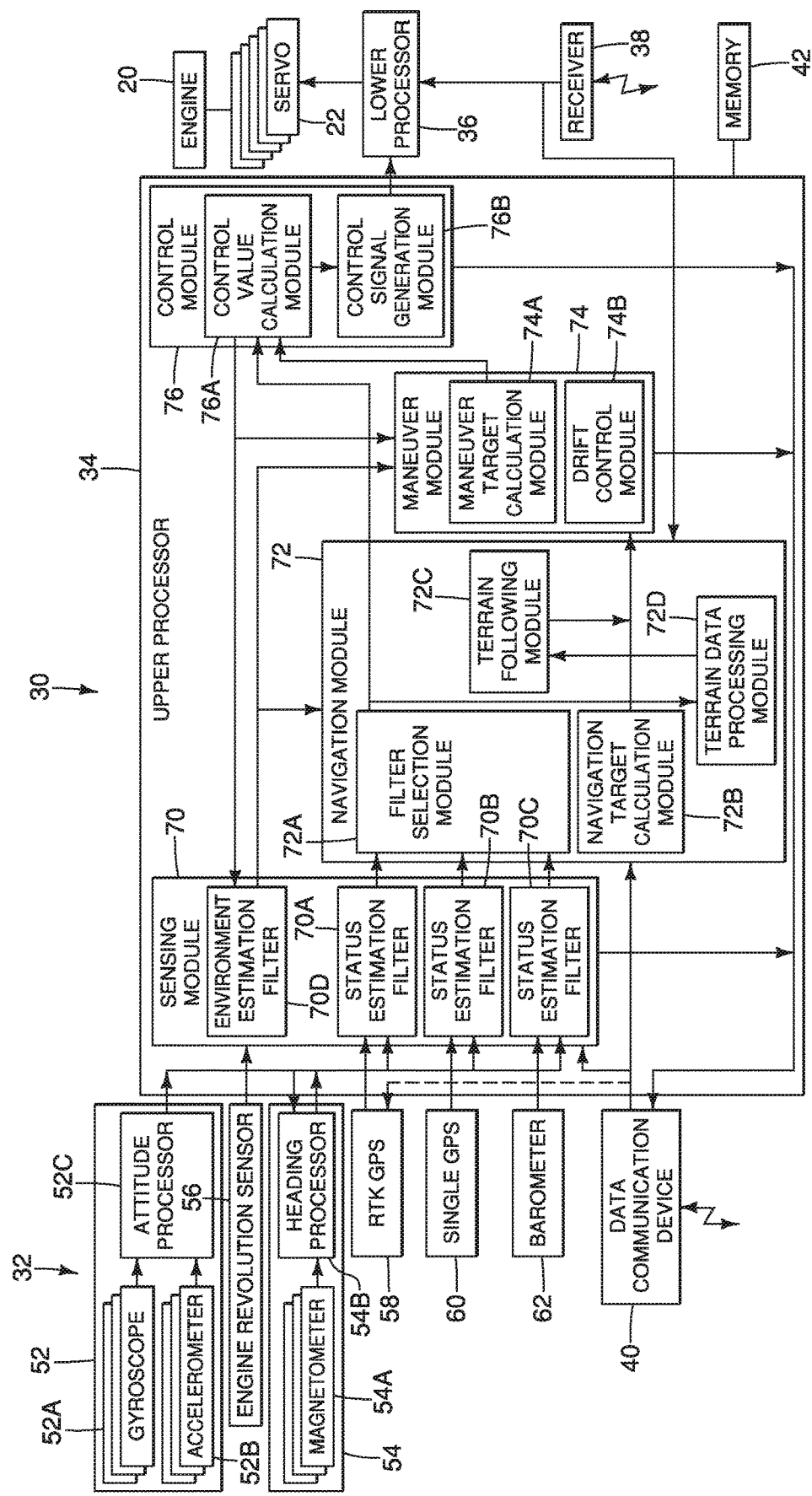
FIG. 3 is a block diagram of a flight control system of the unmanned helicopter illustrated in FIG. 1.

Referring now to FIG. 3, a flight control system 30 of the unmanned helicopter 10 will be described. Specifically, the flight control system 30 includes a plurality of sensors 32, an upper processor 34 (e.g., electronic controller), a lower processor 36 (e.g., electronic controller), a wireless receiver 38 (e.g., a wireless communication device), a data communication device 40 and a computer memory 42 (e.g., a data storage device or memory device). In the illustrated embodiment, the various components of the flight control system 30 are provided on the main body 12 or the tail body 14 in a conventional manner.

In the illustrated embodiment, the unmanned helicopter 10 can fly using a manual remote control or an autonomous control. Specifically, with the manual remote control, the receiver 38 receives radio signals (e.g., manual control command signals) from a remote controller or wireless transmitter (not shown) that is operated by an operator, and outputs control signals to the servos 22 via the lower processor 36 according to the radio signals. The manual remote control of the unmanned helicopter 10 is relatively conventional, and thus, the manual remote control will not be described in detail. With the autonomous control, the upper processor 34 acquires sensing data from the sensors 32 and input data from the data communication device 40 that wirelessly communicates with a ground station (not shown). The upper processor 34 processes the data according to a control program prescribed in advance to output control signals to the servos 22 via the lower processor 36. The lower processor 36 select a control mode of the unmanned helicopter 10 between the manual remote control and the autonomous control according to a manual selection performed on the remote controller, or a radio reception status between the wireless receiver 38 and the remote controller, and the like.

Figure 4:
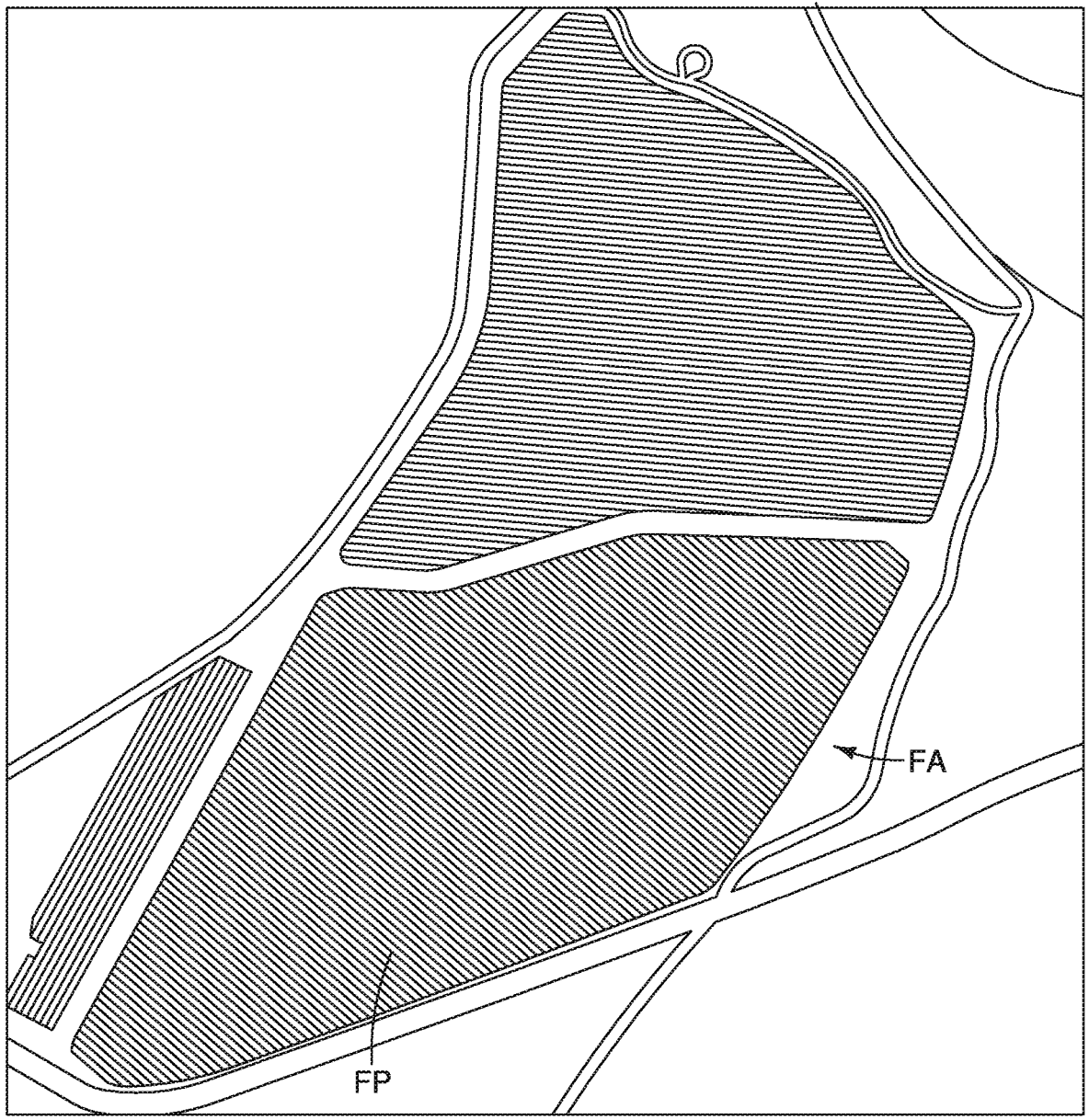
FIG. 4 is a top plan view of a flight area of the unmanned helicopter, illustrating a predetermined flight path of the unmanned helicopter set in a prescribed flight area.
Figure 5:
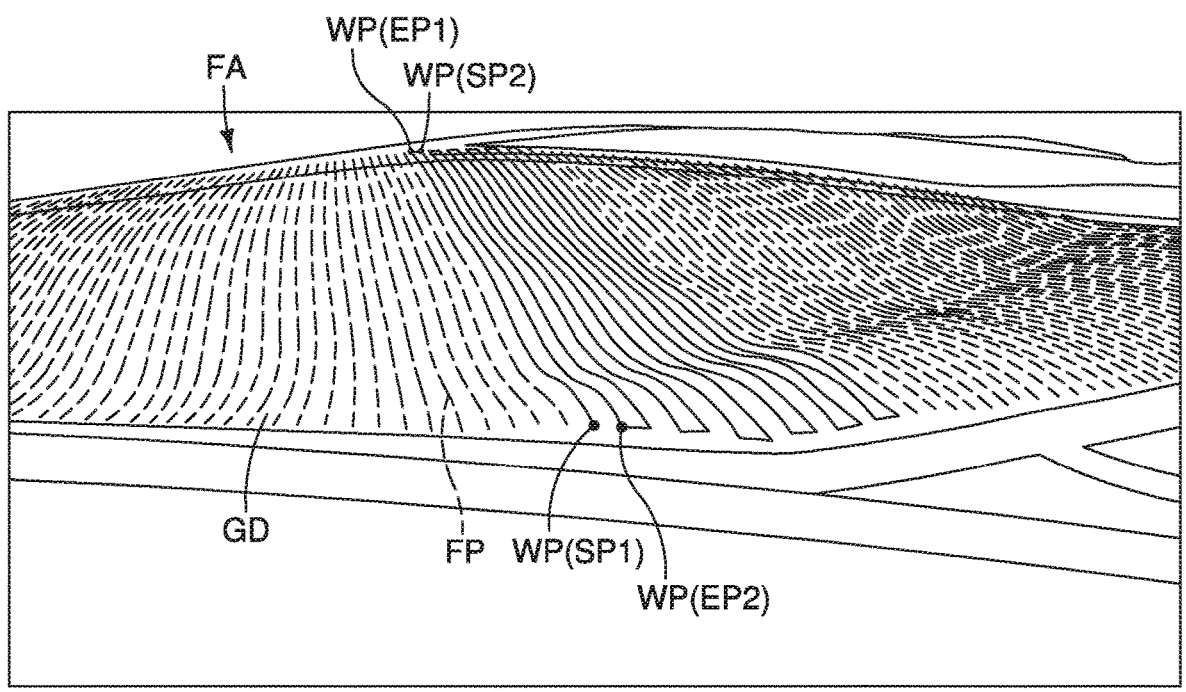
FIG. 5 is an enlarged perspective view of the prescribed flight area of the unmanned helicopter, illustrating the predetermined flight path mapped on the undulating surface of the ground.

In the illustrated embodiment, with the autonomous control, the unmanned helicopter 10 flies over the ground GD along a predetermined flight path FP (see FIG. 4) while maintaining the altitude of the unmanned helicopter 10 relative to the ground GD at the predetermined target altitude Sz (i.e., the terrain following control). Specifically, FIG. 4 illustrates a top plan view of the prescribed flight area FA of the unmanned helicopter 10. The predetermined flight path FP of the unmanned helicopter 10 is set over the prescribed flight area FA so that the unmanned helicopter 10 can entirely fly over the crops in the prescribed flight area FA. More specifically, in the illustrated embodiment, as illustrated in FIG. 5, the predetermined flight path FP (illustrated with dotted line, and partially illustrated with solid line) includes a plurality of waypoints WP that are set only at ends for each pass over the crops in the prescribed flight area FA. In particular, in the illustrated embodiment, the predetermined flight path FP includes waypoints WP as a starting point SP1 and an ending point EP1 for a pass over the crops from the starting point SP1 to the ending point EP1 without a waypoint between the starting point SP1 and the ending point EP1. Once the unmanned helicopter 10 arrives the ending point EP1, the unmanned helicopter 10 automatically flies to a starting point SP2, and then automatically flies to an ending point EP2 for another pass over the crops without a waypoint between the starting point SP2 and the ending point EP2. Thus, in the illustrated embodiment, the upper processor 34 (e.g., the electronic controller) is configured to maintain the predetermined target altitude Sz over the undulating surface of the prescribed flight area FA (e.g., over the uneven terrain of the area). Also, in the illustrated embodiment, the upper processor 34 (e.g., the electronic controller) is further configured to control a flight of the unmanned helicopter 10 that includes the starting point SP1 (SP2) and the ending point EP1 (EP2) for each pass over the crops in the prescribed flight area FA, and the predetermined flight path FP (e.g., the flight path) does not include a waypoint between the starting and ending points SP1 (SP2) and EP1 (EP2). The flight path FP can be set manually or automatically over the ground GD in a conventional manner.

As illustrated in FIG. 3, the sensors 32 include an attitude sensor 52, a heading sensor 54, an engine revolution sensor 56, a RTK (Real Time Kinematic) GPS sensor 58, a single GPS sensor 60 and a barometer 62. The attitude sensor 52 has a three-axis gyroscope 52A, a three-axis accelerometer 52B and an attitude processor 52C. The gyroscope 52A detects rotation (angular velocity) about an X-axis, a Y-axis, and a Z-axis of the unmanned helicopter 10. The accelerometer 52B detects acceleration along the XYZ axes. In the illustrated embodiment, the X-axis of the unmanned helicopter 10 is a longitudinal axis (or a roll axis) of the unmanned helicopter 10, and extends along a longitudinal center line of the unmanned helicopter 10. The Y-axis of the unmanned helicopter 10 is a lateral axis (or a pitch axis) of the unmanned helicopter 10, and extends laterally perpendicular to the X-axis. The Z-axis of the unmanned helicopter 10 is a vertical axis (or a yaw axis) of the unmanned helicopter 10, and extends perpendicular to the XY axes. The attitude processor 52C acquires data from the gyroscope 52A and the accelerometer 52B, and process the data to output attitude data indicative of the attitude of the unmanned helicopter 10. The heading sensor 54 has a three-axis magnetometer 54A and a heading processor 54B. The magnetometer 54A detects the Earth's magnetic field along the XYZ axes. The heading processor 54B acquires data from the magnetometer 54A and the attitude sensor 52, and process the data to output heading data indicative of the heading of the unmanned helicopter 10. The RTK GPS sensor 58 receives satellite signals from satellites and correction data from the ground station via the data communication device 40 to output GPS data including the position (e.g., the latitude or north position Pn, the longitude or east position Pe and the altitude Pz relative to a reference ellipsoid) and the speed (the velocity to north Vn (north velocity Vn) and the velocity to east Ve (east velocity Ve)) of the unmanned helicopter 10. The single GPS sensor 60 receives satellite signals from satellites to output GPS data including the position and the speed of the unmanned helicopter 10. The barometer 62 detects the atmospheric pressure and the temperature. The configurations of the sensors 32 are relatively conventional, and thus will not be described in detail. In the illustrated embodiment, the sensors 32 include the RTK GPS sensor 58 and the single GPS sensor 60 to detect the position and the speed of the unmanned helicopter 10. However, the sensor 32 can include different types of sensors to detect the position and the speed of the unmanned helicopter 10. For example, the position data can be derived from satellite-based positioning systems (global navigation satellite systems, GNSS) other than GPS, such as, GLONASS, Galileo and BeiDou, for example. Thus, in the illustrated embodiment, the unmanned helicopter 10 includes the RTK GPS sensor 58 and the single GPS sensor 60 (e.g., at least one sensor) configured to detect the position (e.g., the current position and the altitude) of the unmanned helicopter 10 and the speed of the unmanned helicopter 10. The RTK GPS sensor 58 and/or the single GPS sensor 60 is an example of a GPS sensor of the present disclosure.

As illustrated in FIG. 3, the upper processor 34 includes a sensing module 70, a navigation module 72, a maneuver module 74 and a control module 76. The upper processor 34 includes a microcomputer or processor, such as a CPU (Central Processing Unit). The upper processor 34 is programmed to control the various components of the unmanned helicopter 10. The computer memory 42 stores processing results and control programs such as ones for controlling the unmanned helicopter 10. For example, the computer memory 42 stores processing results or the sensing data acquired from the sensors 32. Thus, the upper processor 34 communicates with the computer memory 42 to store processing results in the computer memory 42 as well as to read the sensing data acquired from the sensors 32 and the stored processing results in the computer memory 42. It will be apparent to those skilled in the art from this disclosure that the precise structure and algorithms for the upper processor 34 can be any combination of hardware and software that will carry out the functions discussed herein. Furthermore, the upper processor 34 can also include a plurality of processors corresponding to the various modules of the upper processor 34.

The sensing module 70 includes a plurality of (three in FIG. 3) status estimation filters 70A, 70B and 70C and an environment estimation filter 70D. The status estimation filters 70A and 70B each have a GPSINS (Inertial Navigation System). The status estimation filters 70A and 70B acquires the GPS data indicative of the position and the speed of the unmanned helicopter 10 from the RTK GPS sensor 58 and the single GPS sensor 60, respectively. The status estimation filters 70A and 70B correct delays and/or errors in the GPS data from the the RTK GPS sensor 58 and the single GPS sensor 60 using the attitude data from the attitude sensor 52 and/or the heading data from the heading sensor 54 to output the position and the speed of the unmanned helicopter 10. The status estimation filter 70C acquires the attitude data from the attitude sensor 52, the atmospheric pressure and the temperature from the barometer 62, and/or the input data from the data communication device 40. The status estimation filter 70C outputs data required for operating the unmanned helicopter 10 when the position and the speed of the unmanned helicopter 10 from the RTK GPS sensor 58 and the single GPS sensor 60 cannot be used for the autonomous control. The environment estimation filter 70D acquires control deviations (e.g., deviation of the attitude) from the control module 76 and the speed of the unmanned helicopter 10 derived from the status estimation filter 70A or 70B, and estimates the airspeed of the unmanned helicopter 10 as an environment estimation value for a navigation target calculation at the navigation module 72 or for a drift control at the maneuver module 74. The configurations of the sensing module 70 are relatively conventional, and thus the detailed description will be omitted for the sake of brevity.

The navigation module 72 includes a filter selection module 72A, a navigation target calculation module 72B, a terrain following module 72C and a terrain data processing module 72D. The filter selection module 72A selects one of the status estimation filters 70A, 70B and 70C according to the accuracy of the position and the speed of the unmanned helicopter 10 of the status estimation filters 70A, 70B and 70C and the input data from the data communication device 40 that indicates the selection of one of the status estimation filters 70A, 70B and 70C. Then, the filter selection module 72A outputs the position and the speed of the unmanned helicopter 10 derived from the selected one of the status estimation filters 70A, 70B and 70C together with the attitude data, the heading data and the engine speed derived from the attitude sensor 52, the heading sensor 54 and the engine revolution sensor 56, respectively, as a status estimation value. The navigation target calculation module 72B calculates navigation target of the unmanned helicopter 10 based on the input data from the data communication device 40. Specifically, in the illustrated embodiment, the input data from the data communication device 40 includes the positions (the latitude and the longitude) of the waypoints WP that are set along the predetermined flight path FP of the unmanned helicopter 10, and the predetermined target altitude Sz of the unmanned helicopter 10 relative to the ground GD. The navigation target calculation module 72B calculates a target position (the latitude or north position and the longitude or east position) and a target speed (the north velocity and the east velocity) of the unmanned helicopter 10 based on the the positions of the waypoints WP, and outputs the target position and the target speed as the navigation target. This navigation target calculation by the navigation target calculation module 72B is relatively conventional, and thus will not be described in detail.

The terrain following module 72C calculates a target speed (a target velocity in vertical direction Vz (target elevation speed or target vertical velocity Vz)) to maintain the altitude of the unmanned helicopter 10 relative to the ground GD at the predetermined target altitude Sz. Specifically, the terrain following module 72C calculates the target vertical velocity Vz based on calculation results of the terrain data processing module 72D, and outputs the target vertical velocity Vz to the maneuver module 74 as the navigation target. The processing of the terrain following module 72C and the terrain data processing module 72D (i.e., the terrain following control) will be described in detail later.

The maneuver module 74 calculates a maneuver target of the unmanned helicopter 10 based on the navigation target derived from the navigation target calculation module 72B and the terrain following module 72C, the control deviations derived from the control module 76 and the environment estimation value from the environment estimation filter 70D. Specifically, in the illustrated embodiment, the maneuver module 74 includes a maneuver target calculation module 74A and a drift control module 74B. The maneuver target calculation module 74A generates a target attitude, a target speed, a target position and a target engine speed of the unmanned helicopter 10 for the unmanned helicopter 10 to smoothly follow or track the navigation target. The drift control module 74B corrects the maneuver target to compensate the effect of the wind based on the control deviation (e.g., deviation of the attitude) derived from the control module 76, for example. This maneuver target calculation by the maneuver module 74 is relatively conventional, and thus will not be described in detail.

The control module 76 includes a control value calculation module 76A and a control signal generation module 76B. The control value calculation module 76A calculates control values of the servos 22 such that the status estimation value derived from the navigation module 72 becomes closer to the maneuver target derived from the maneuver module 74. In particular, in the illustrated embodiment, the control value calculation module 76A performs a feedback control, and serves as a PID controller, for example. The control signal generation module 76B generates the control signal applied to the servos 22 according to the control values calculated by the control value calculation module 76A. The processing of the control module 76 is relatively conventional, and thus will not be described in detail.

As illustrated in FIG. 3, the sensing module 70, the navigation module 72, the maneuver module 74 and the control module 76 also output the data calculated therein to the data communication device 40 so that the ground station can monitor the status of the unmanned helicopter 10.

Figure 6:
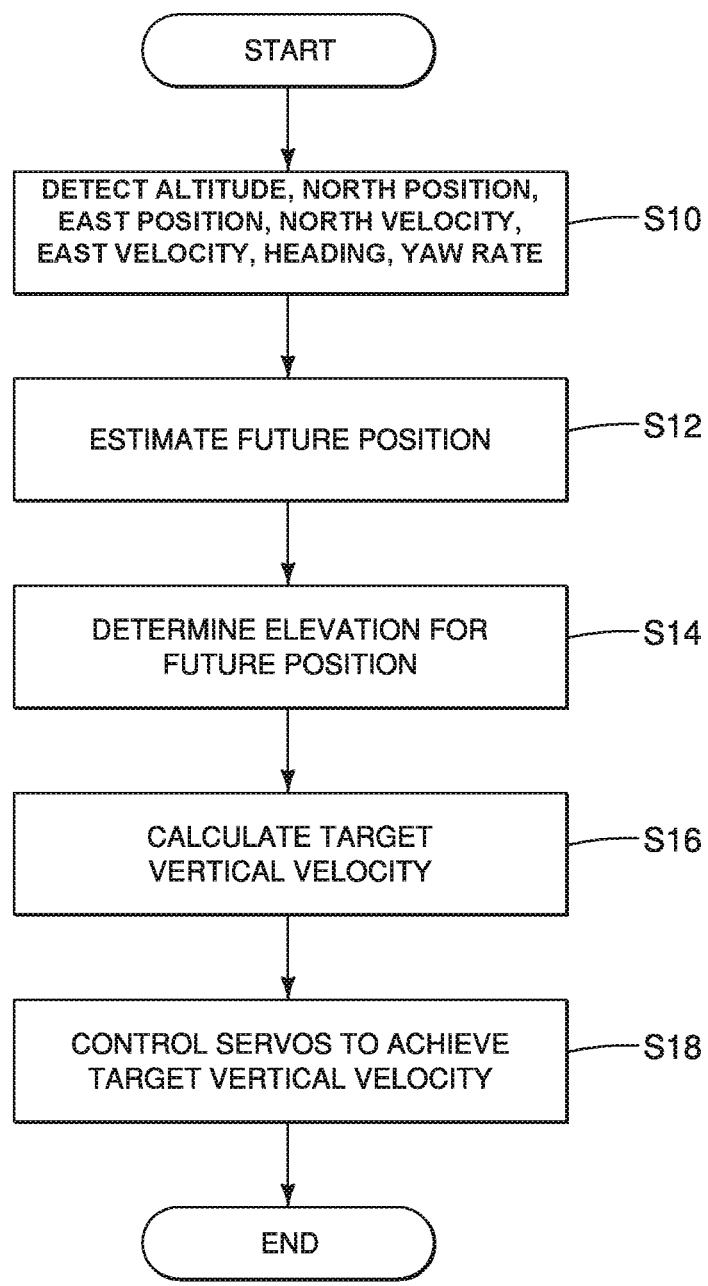
FIG. 6 is a flow chart of the terrain following control executed by the flight control system of the unmanned helicopter, illustrating the overall process of the terrain following control.
Figure 7:
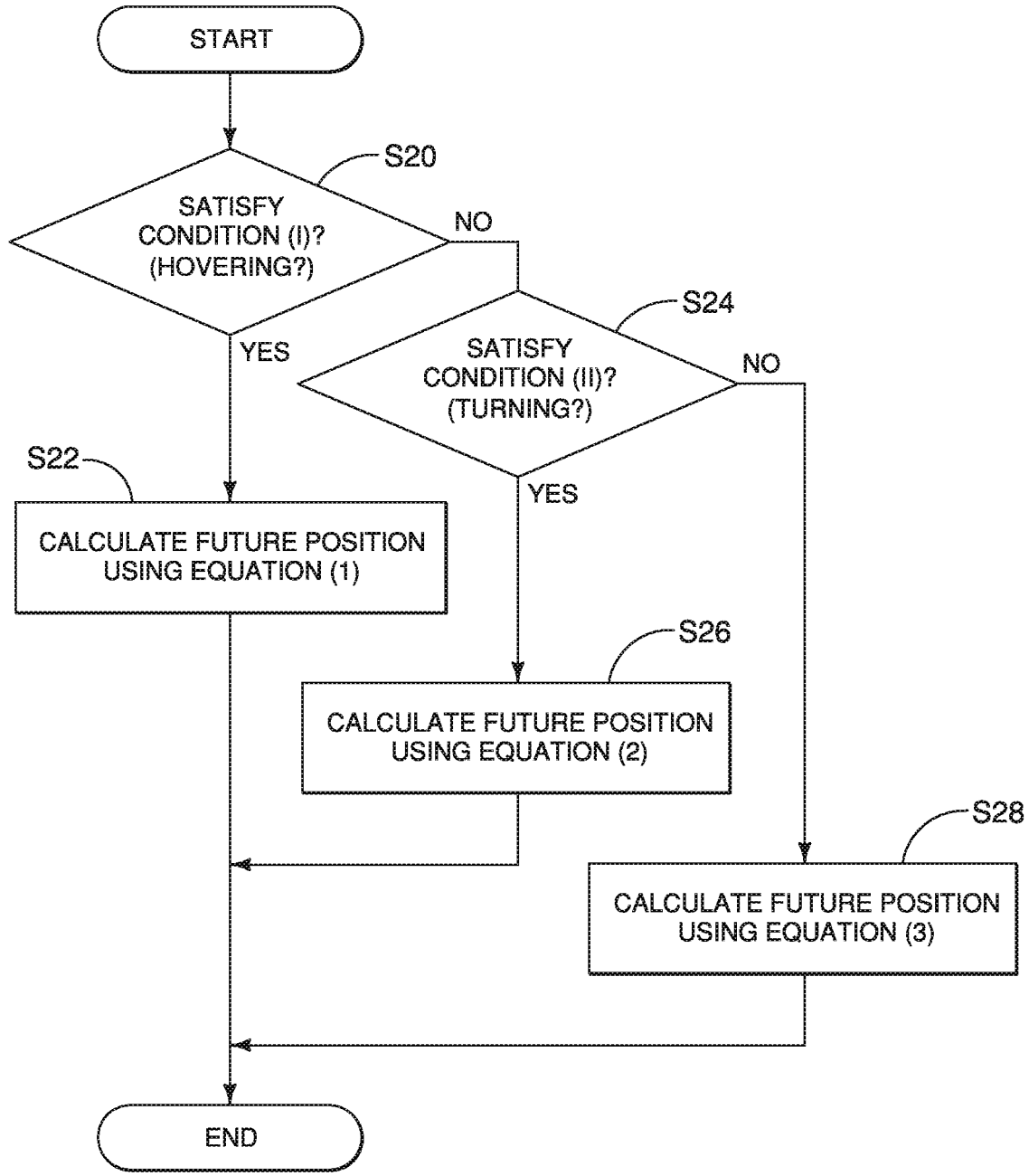
FIG. 7 is a flow chart of the terrain following control executed by the flight control system of the unmanned helicopter, illustrating a calculation process of a future position of the unmanned helicopter.

Referring now to FIGS. 3, 6 and 7, the terrain following control that is executed by the upper processor 34 (e.g., electronic controller) will be described in detail. As mentioned above, with the terrain following control, the unmanned helicopter 10 flies over the ground GD along the predetermined flight path FP while maintaining the altitude of the unmanned helicopter 10 relative to the ground GD at the predetermined target altitude Sz.

Specifically, referring to FIG. 6, with the terrain following control (e.g., the aircraft altitude controlling method), the altitude Pz of the unmanned helicopter 10, the north position Pn and the east position Pe (e.g., the current position) of the unmanned helicopter 10, and the north velocity Vn and the east velocity Ve (e.g., the speed) of the unmanned helicopter 10 are detected by the RTK GPS sensor 58 and/or the single GPS sensor 60 (step S10). Also, in the illustrated embodiment, in step S10, the heading and the attitude (e.g., yaw rate Ω) of the unmanned helicopter 10 are also detected.

Furthermore, in step S12, the terrain data processing module 72D estimates a future position of the unmanned helicopter 10 based on the north position Pn and the east position Pe (e.g., the detected current position) and the north velocity Vn and the east velocity Ve (e.g., the detected speed) of the unmanned helicopter 10 derived from the filter selection module 72A. Also, in the illustrated embodiment, the terrain data processing module 72D estimates the future position of the unmanned helicopter 10 further based on the heading (e.g., direction) of the unmanned helicopter 10. In particular, in the illustrated embodiment, the terrain data processing module 72D estimates a future position after one second, a future position after five seconds, and a future position after ten seconds based on the north position Pn, the east position Pc, the north velocity Vn, the east velocity Ve, and the yaw rate $\Omega$ of the unmanned helicopter 10 derived from the filter selection module 72A. In the illustrated embodiment, Pn represents the current north position (i.e., a north position after zero seconds) of the unmanned helicopter 10, while Pn(dt) represents a future north position after dt seconds. Similarly, Pc represents the current east position (i.e., an east position after zero seconds), while Pe(dt) represents a future east position after dt seconds.

More specifically, as illustrated in FIG. 7, the terrain data processing module 72D of the upper processor 34 (e.g., electronic controller) first determines whether the unmanned helicopter 10 is hovering (step S20). Specifically, the terrain data processing module 72D determines whether the following condition (I) is satisfied:

$$|Ve|<A \text{ AND } |Vn|<A \quad (\text{I})$$

where Ve (m/s) represents the velocity east, Vn (m/s) represents the velocity north, and A (m/s) represents a threshold. In the illustrated embodiment, the threshold A is set to 0.05 (m/s), for example. In other words, the terrain data processing module 72D determines whether the velocity east Ve and the velocity north Vn of the unmanned helicopter 10 are within a range (a square) defined by the threshold A. Of course, instead of using the above-mentioned condition (I), hovering of the unmanned helicopter 10 can be determined using the magnitude of the velocity vector (i.e., $\sqrt{(Ve^2+Vn^2)}$) of the unmanned helicopter 10. Specifically, in this case, hovering of the unmanned helicopter 10 can be determined when the terrain data processing module 72D determines that the magnitude of the velocity vector is less than a predetermined threshold.

If the condition (I) is satisfied, then the terrain data processing module 72D determines that the unmanned helicopter 10 is hovering (YES in step S20). Then, the terrain data processing module 72D determines that the velocity east Ve and the velocity north Vn are zero (Ve=0 and Vn=0), and the future position after dt seconds (Pn(dt), Pe(dt)) is calculated by the following equations (1) in step S22:

$$Pn(dt)=Pn; \text{ and}$$

$$Pe(dt)=Pe. \quad (1)$$

On the other hand, if the condition (1) is not satisfied, then the terrain data processing module 72D determines that the unmanned helicopter 10 is not hovering, and is traveling (NO in step S20). Then, the terrain data processing module 72D further determines whether the unmanned helicopter 10 is turning (step S24). Specifically, the terrain data processing module 72D determines whether the following condition (II) is satisfied:

$$|\Omega| \geq B \quad (\text{II})$$

where $\Omega$ (rad/s) represents the yaw rate, and B (rad/s) represents a threshold. In the illustrated embodiment, the threshold B is set to $\pi/360$ (rad/s) (=0.5 (deg/s)), for example.

If the condition (II) is satisfied, then the terrain data processing module 72D determines that the unmanned helicopter 10 is turning (YES in step S24). Then, the terrain data processing module 72D calculates the future position after dt seconds (Pn(dt). Pe(dt)) by the following equations (2) in step S26:

$$Pn(dt)=Pn+\Delta n; \text{ and}$$

$$Pe(dt)=Pe+\Delta e \quad (2)$$

where $\Delta n$ represents an amount of travel to north during dt seconds, and $\Delta e$ represents an amount of travel to east during dt seconds. The terrain data processing module 72D calculates the amounts of travel ($\Delta n$, $\Delta e$) as follows:

$$\Delta n = \Delta x \cdot \sin \psi + \Delta y \cdot \cos \psi; \text{and}$$

$$\Delta e = \Delta x \cdot \cos \psi \cdot \Delta y \cdot \sin \psi$$

where $\Delta x$ represents an amount of travel along the X-axis during dt seconds, $\Delta y$ represents an amount of travel along the Y-axis during dt seconds, and $\psi$ (rad) represents the direction in which the unmanned helicopter 10 is traveling (i.e., the track over the ground). The terrain data processing module 72D calculates the amounts of travel ($\Delta x$, $\Delta y$), and the direction $\psi$ as follows:

$$\Delta x = R \sin \theta:$$

$$\Delta y = R(1-\cos \theta) \times \text{sign}(\text{turn}); \text{ and}$$

$$\psi = \tan^{-1}(Vn/Ve).$$

where R (m) represents a turn radius of the unmanned helicopter 10, $\theta$ (rad) represents an amount of turn during dt seconds, and sign(turn) represents the direction of turn. The terrain data processing module 72D calculates the turn radius R and the amount of turn $\theta$ as follows:

$$R=V/|\Omega|, \text{ where } V=\sqrt{(Ve^2+Vn^2)}; \text{ and}$$

$$\theta = \Omega \cdot dt.$$

Also, the sign function sign(turn) represents the direction of turn of the unmanned helicopter 10, and the parameter "turn" is calculated as follows:

$$\text{turn}=\text{sign}(\Omega).$$

On the other hand, if the condition (II) is not satisfied, then the terrain data processing module 72D determines that the unmanned helicopter 10 is not turning, and is traveling straight (NO in step S24). Then, the terrain data processing module 72D calculates the future position after dt seconds (Pn(dt), Pe(dt)) by the following equations (3) in step S28:

$$Pn(dt)=Pn+\Delta n; \text{ and}$$

$$Pe(dt)=Pe+\Delta e \quad (3)$$

where the amounts of travel ($\Delta n$, $\Delta e$) are calculated as follows:

$$\Delta n = Vn \cdot dt; \text{and}$$

$$\Delta e = Ve \cdot dt.$$

Figure 8:
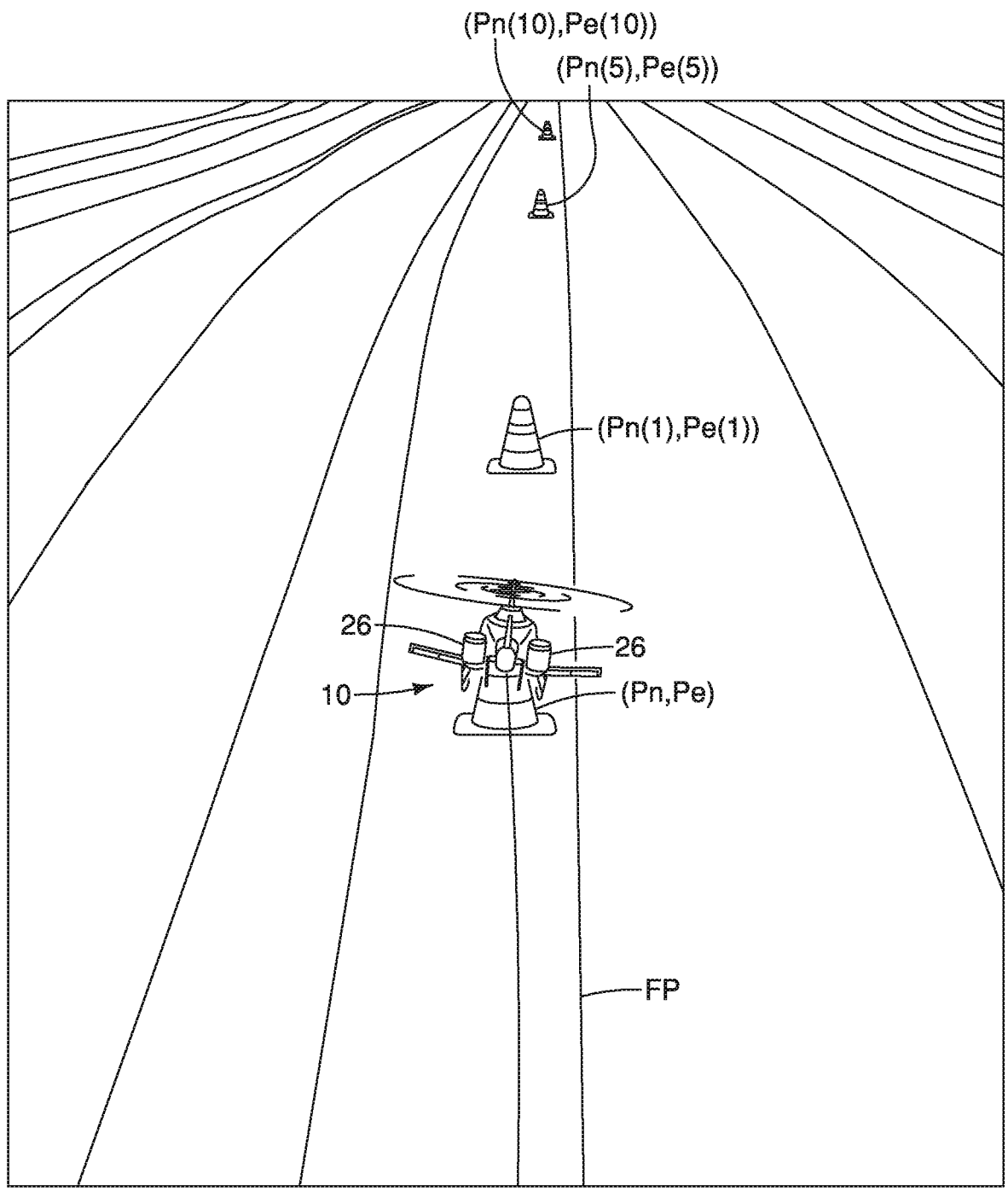
FIG. 8 is a display image displayed on a display in a ground station, showing flight status (future positions) of the unmanned helicopter.

In the illustrated embodiment, the terrain data processing module 72D estimates the future position after one second (Pn(1), Pe(1)), the future position after five seconds (Pn(5), Pe(5)), and the future position after ten seconds (Pn(10), Pe(10)), for example. The estimated future positions are outputted to the data communication device 40 so that the ground station can monitor the status of the unmanned helicopter 10. FIG. 8 illustrates a display image displayed on a display in the ground station, showing the estimated future positions of the unmanned helicopter 10 relative to the predetermined flight path FP. Of course, the terrain data processing module 72D can further estimate different future positions at different timings, as needed and/or desired. Also, the terrain data processing module 72D does not need to estimate all of the future positions described above. The terrain data processing module 72D can estimate only the future position after one second (Pn(1), Pe(1)), for example.

Figure 9:
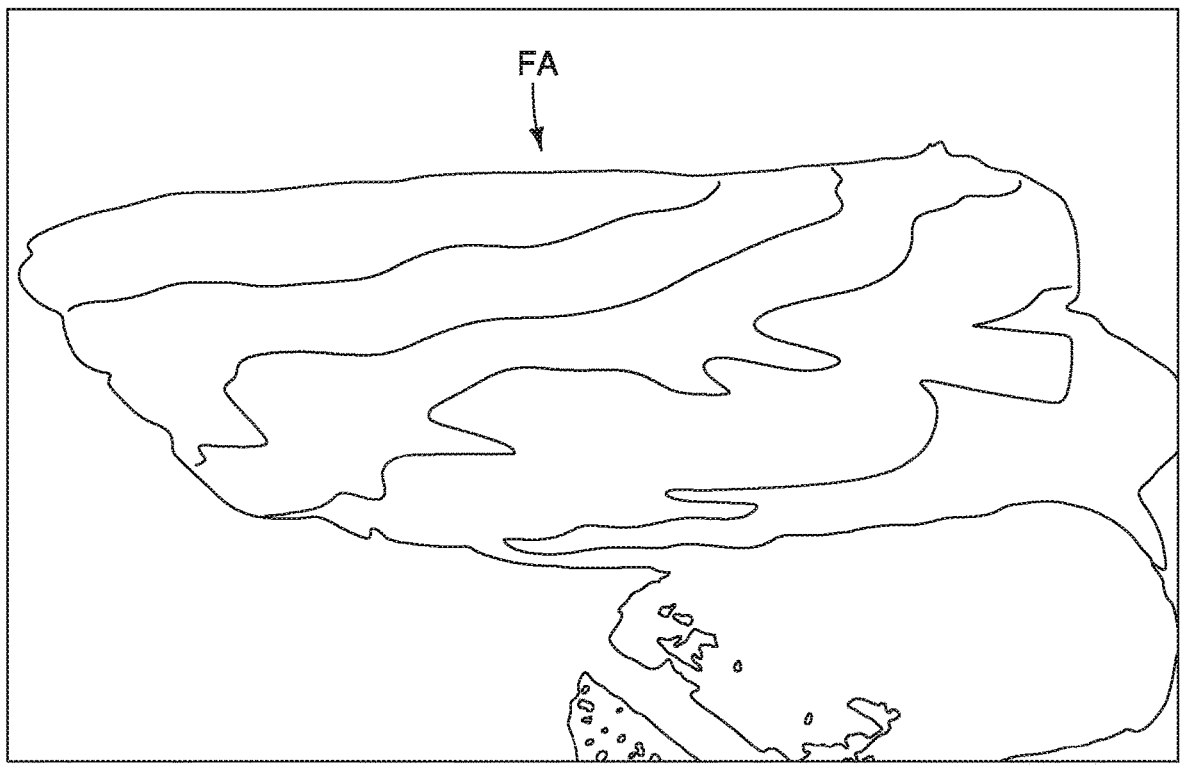
FIG. 9 illustrates an example of DEM data of the prescribed flight area, illustrating a two-dimensional contour graph of the prescribed flight area.

Referring further to FIG. 6, in step S14, the terrain data processing module 72D determines the elevation (e.g., the predetermined terrain data) for the future position. Specifically, in the illustrated embodiment, the computer memory 42 stores the digital elevation model (DEM) data (e.g., the predetermined terrain data) for at least the prescribed flight area FA. The DEM data is a pre-mapped three-dimensional terrain data, and includes the elevation (height information relative to a reference ellipsoid) of the terrain's surface in association with the position. More specifically, in the illustrated embodiment, the DEM data includes datasets each having HAE (height above ellipsoid) data with ⅓₀ arc-second (approximately 1 meter) resolution, for example. FIG. 9 illustrates an example of the DEM data of the prescribed flight area FA, illustrating a two-dimensional contour graph of the prescribed flight area FA. In the illustrated embodiment, the terrain data processing module 72D refers to the DEM data (a corresponding section of the DEM data) in the computer memory 42 to acquire the elevation DEM(1) corresponding to the future position after one second (Pn(1), Pe(1)). In the illustrated embodiment, the terrain data processing module 72D also refers to the DEM data (a corresponding section of the DEM data) in the computer memory 42 to acquire the elevation DEM(0) corresponding to the current position (Pn, Pe) of the unmanned helicopter 10. In the illustrated embodiment, the DEM data is an example of the predetermined terrain data of the present disclosure. However, the terrain data processing module 72D can use different type of predetermined terrain data for determining the elevation for the future position.

In the illustrated embodiment, the DEM data is generated and stored in advance by scanning the surface of a scanned area that includes the prescribed flight area FA with a laser scanner, such as a laser rangefinder, in an aircraft, for example. In the illustrated embodiment, an unmanned helicopter is used for scanning the surface of the scanned area, for example. The unmanned helicopter is controlled to follow waypoints arranged at 30 meter intervals while automatically maintaining the altitude at 30 meters relative to the surface of the scanned area using a radio altimeter, for example. With this scanning flight, the unmanned helicopter maintains the altitude relative to the surface of the scanned area. Thus, the distance between the laser rangefinder and the surface of the scanned area can be kept constant, which improves the accuracy of the scanning over the entire scanned area even if the scanned area has an uneven terrain. Of course, during this scanning flight, the unmanned helicopter can maintain the altitude different from 30 meters relative to the surface of the scanned area. However, by maintaining the altitude of 30 meters relative to the surface of the scanned area, it can be prevented that blown sand particles or turbulence of the crops due to helicopter downwash interfere the scanning of the surface of the scanned area by the laser rangefinder. Furthermore, once the scanning flight is completed, the post processing for the range data derived from the laser rangefinder is conducted. Specifically, with the post processing, the attitude and position data of the unmanned helicopter are interpolated onto the range data time instances to obtain point cloud data (ground return data). The user can manually edit the point cloud data to remove invalid data due to sand particles caused by helicopter downwash or vehicles located in the scanned area. The point cloud data is further processed to generate the DEM data. Specifically, the scanned area is divided into cells having 1 meter cell size, and the point cloud data is distributed into the cells. Furthermore, each of the cells is divided into 16 sub-cells (four rows and four columns). The points indicating the lowest ground position in the sub-cells are selected, respectively, and the median of the selected points is calculated as the ground position (the elevation) of the cell. This filters out high points which are possibly anomalous returns or the returns from the crops on the scanned area. Then, the ground positions (the elevations) of the cells are stored as the DEM data. The generation of the DEM data is relatively conventional, and thus will not be described in detail. By filtering the range data and adjusting the resolution, the smoothness of the DEM data can be adjusted as needed and/or desired. Of course, the DEM data that is publicly available can also be used for the terrain following control of the unmanned helicopter 10. In particular, a blank data area can occur in the generated DEM data. Thus, the generated DEM data can be merged with the publicly available DEM data, which is usually coarser than the generated DEM data. With this processing, the DEM data without a blank data area can be generated. Also, if the undulation of the surface of the ground GD is relatively gentle, then it is also possible to generate the DEM data using only publicly available survey results.

Figure 10:
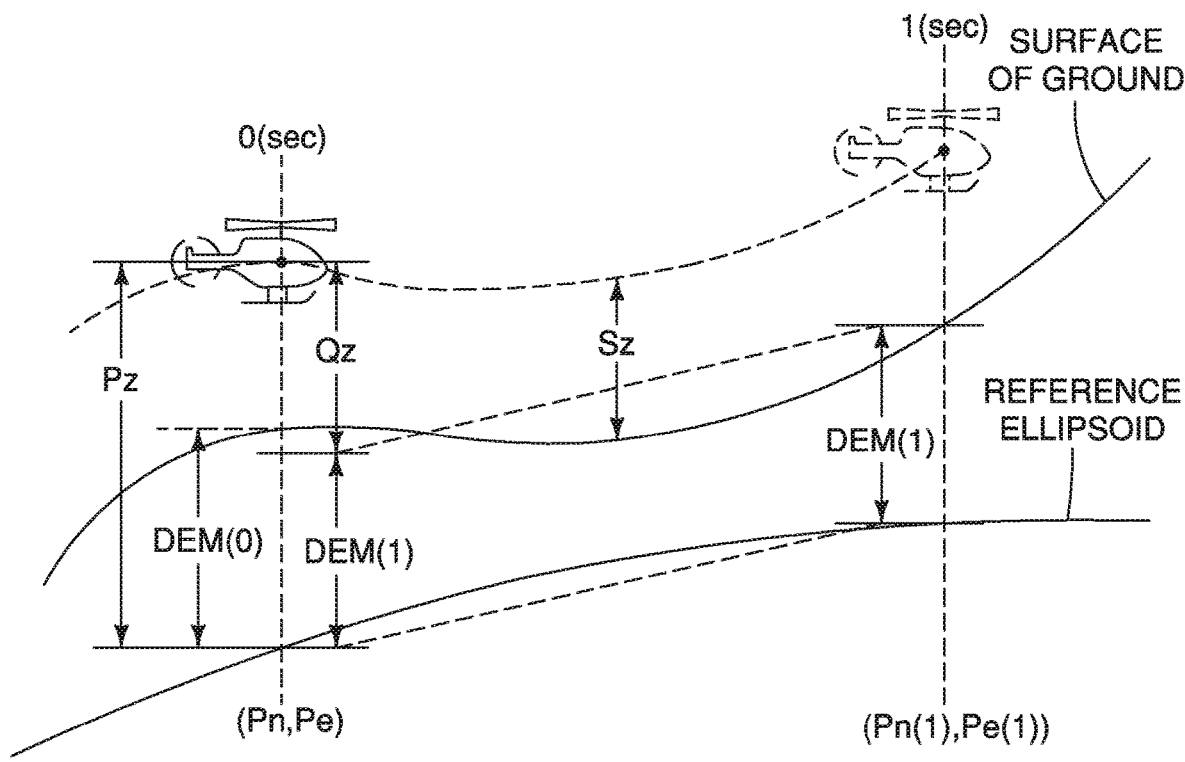
FIG. 10 is a schematic diagram illustrating the terrain following control executed by the flight control system of the unmanned helicopter.
Figure 11:
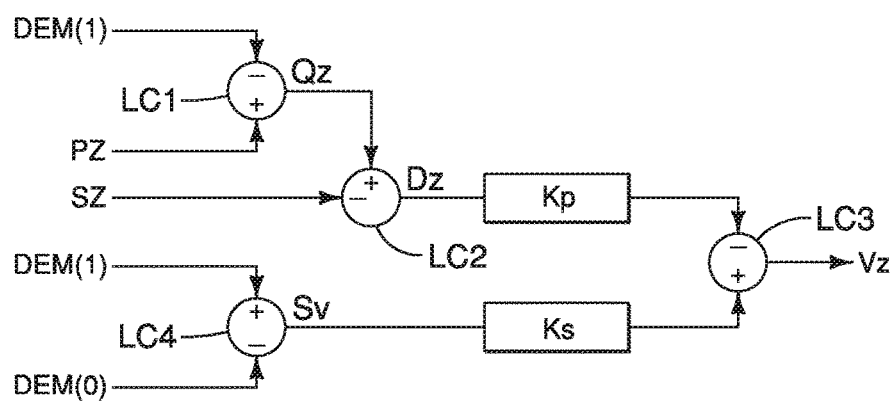
FIG. 11 is a logic circuit diagram illustrating the terrain following control executed by the flight control system of the unmanned helicopter illustrated in FIG. 1, illustrating a calculation process of a target vertical velocity of the unmanned helicopter.

Referring further to FIG. 6, in step S16, the terrain following module 72C calculates the target vertical velocity Vz of the unmanned helicopter 10 based on the elevation from the DEM data and the altitude Pz of the unmanned helicopter 10. More specifically, as shown in FIGS. 10 and 11, the terrain following module 72C calculates the difference between the altitude Pz (e.g., the detected altitude) and the elevation DEM(1) (e.g., the predetermined terrain data) for the future position (Pn(1), Pe(1)). Specifically, as shown in the logic circuit of FIG. 11, the terrain following module 72C subtracts the elevation DEM(1) from the altitude Pz to obtain an altitude value Qz (e.g., DEM altitude) (operation LC1). Furthermore, the terrain following module 72C calculates the difference between the altitude value Qz and the predetermined target altitude Sz. Specifically, the terrain following module 72C subtracts the predetermined target altitude Sz from the altitude value Qz to obtain an altitude deviation Dz relative to the predetermined target altitude Sz (operation LC2). The terrain following module 72C further multiplies the altitude deviation Dz by a predetermined gain Kp to obtain the target vertical velocity Vz (operation LC3). In the illustrated embodiment, when the altitude value Qz is larger than the predetermined target altitude Sz, as illustrated in FIG. 10, then the target vertical velocity Vz has a negative value that descends the unmanned helicopter 10. On the other hand, when the altitude value Qz is smaller than the predetermined target altitude Sz, then the target vertical velocity Vz has a positive value that ascends the unmanned helicopter 10.

Optionally, in the illustrated embodiment, as illustrated in the logic circuit of FIG. 11, in step S16 of FIG. 6, the terrain following module 72C calculates the difference between the elevation DEM(1) for the future position (Pn(l), Pe(l)) and the elevation DEM(0) for the position (Pn, Pe). Specifically, the terrain following module 72C subtracts the elevation DEM(0) from the elevation DEM(1) to obtain a slope value Sv (operation LC4). The terrain following module 72C further multiplies the slope value Sv by a predetermined gain Ks to obtain the target vertical velocity Vz (operation LC3). Specifically, in this case, in operation LC3, the terrain following module 72C subtracts the altitude deviation Dz multiplied by the gain Kp from the slope value Sv multiplied by the gain Ks to obtain the target vertical velocity Vz. However, these operations LC4 and LC3 are optional as mentioned above, and thus does not need to be performed. Alternatively, when these operations LC4 and LC3 are conducted, the gain Ks can be set to be small relative to the gain Kp, such as 1/10 of the gain Kp. In the illustrated embodiment, the elevation DEM(1) for the future position after one second (Pn(1), Pe(1)) is used to calculate the target vertical velocity Vz. However, the elevation for different future positions at different timings can be used to calculate the target vertical velocity Vz, as needed and/or desired.

As mentioned above, the terrain following module 72C outputs the target vertical velocity Vz to the maneuver module 74 as part of the navigation target. Referring further to FIG. 6, in step S18, the maneuver module 74 generates the maneuver target based on the navigation target derived from the navigation module 72, and the control module 76 controls the servos 22 to achieve the target vertical velocity Vz of the navigation target. Thus, in the illustrated embodiment, the altitude of the unmanned helicopter 10 is controlled based on the future position (Pn(1), Pe(1)), the altitude Pz (e.g., detected altitude), and the DEM data (e.g., the predetermined terrain data) of the prescribed flight area FA. Also, in the illustrated embodiment, the control module 76 controls the servos 22 (e.g., the altitude actuator) based on the difference between the altitude Pz (e.g., the detected altitude) and the elevation DEM(1) (e.g., the predetermined terrain data) for the future position (Pn(1), Pe(l)).

Figure 12:
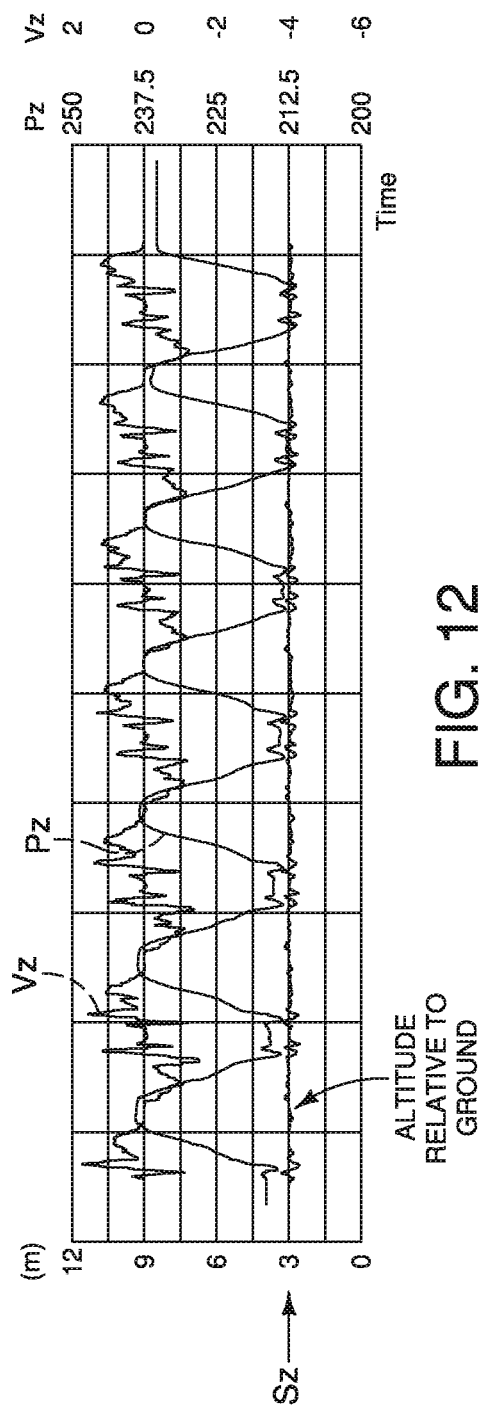
FIG. 12 is a graph showing control results of the terrain following control in accordance with one embodiment.
Figure 13:
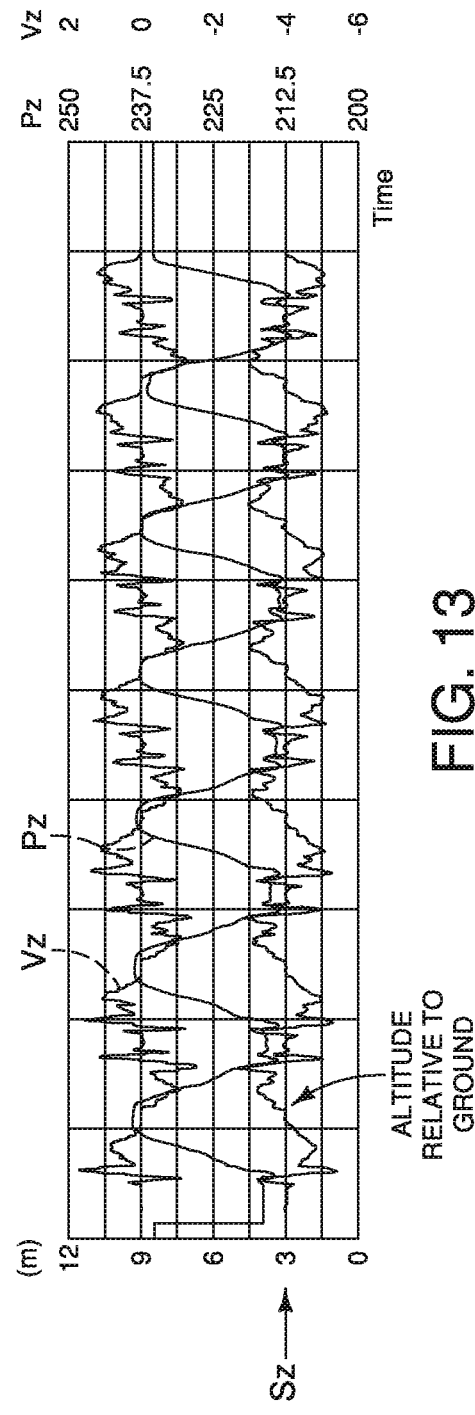
FIG. 13 is a graph showing control result of a terrain following control in accordance with a comparative example.

FIG. 12 illustrates control results of the terrain following control of the present disclosure during flying over the prescribed flight area FA, while FIG. 13 illustrates control results of a terrain following control of a comparative example during flying over the same flight area FA. In the comparative example, the elevation DEM(0) for the current position (Pn, Pe) is used instead of the elevation DEM(1) for calculating the target vertical velocity Vz according to the logic circuit diagram shown in FIG. 11.

FIG. 12 shows the altitude of the unmanned helicopter 10 relative to the ground GD, the altitude Pz and the target vertical velocity Vz. As illustrated in FIG. 12, the altitude of the unmanned helicopter 10 relative to the ground GD is kept within a range of +/−0.5 meters relative to the predetermined target altitude Sz of 3.0 meter. On the other hand, as illustrated in FIG. 13, the altitude relative to the ground GD largely deviates relative to the predetermined target altitude Sz of 3.0 meter (a range of +/−1.5 meters). In particular, as illustrated in FIG. 13, the altitude relative to the ground GD is lower than the predetermined target altitude Sz during ascending and is higher than the predetermined target altitude Sz during descending. Thus, with the comparative example, the altitude relative to the ground GD constantly deviates relative to the predetermined target altitude Sz of 3.0 meter.

In the illustrated embodiment, the future position of the unmanned helicopter 10 is calculated based on the sensing results (e.g., the position, the speed and the heading) of the unmanned helicopter 10, and the elevation for the future position is used for the terrain following control. By using the future position and the elevation for the future position, it is not necessary to control the unmanned helicopter 10 sharply. Also, it is not necessary to secure extra margin in the predetermined target altitude Sz since the unmanned helicopter 10 can well follow the terrain of the ground GD. Also, as shown in FIG. 7, the future position of the unmanned helicopter 10 can also be calculated even while turning.

In the illustrated embodiment, it is not necessary to prepare a large number of waypoints for the terrain following control. Specifically, in the illustrated embodiment, as illustrated in FIG. 5, a pair of waypoints WP indicating the starting point SP1 (SP2) and the ending point EP1 (EP2) is only needed for each pass. Also, in the illustrated embodiment, each of the waypoints WP does not need to have three-dimensional information, but can only have the two-dimensional information (i.e., the latitude and the longitude). Furthermore, in the illustrated embodiment, it is not necessary to prepare waypoints with altitude information between the starting point SP1 (SP2) and the ending point EP1 (EP2).

In the illustrated embodiment, the terrain following control is performed by the upper processor 34 (e.g., electronic controller) without a ground altimeter or range finder. Thus, in the illustrated embodiment, the terrain following control can be performed even when the predetermined target altitude Sz is outside the measurement range of the ground altimeter or range finder. Also, when the ground altimeter or range finder is used for the terrain following control, the future position or the elevation for the future position cannot be obtained. Also, the noise reduction for the range data needs to be performed. Thus, the delay in the terrain following control using the ground altimeter or range finder can become larger. Also, when the dead band needs to be set, the control results can get worse. On the other hand, in the illustrated embodiment, the terrain following control can be performed without a ground altimeter or range finder. Thus, the response and the control results in the terrain following control can be improved.

In the illustrated embodiment, as shown in FIG. 3, the predetermined flight path FP of the unmanned helicopter 10 is provided to the navigation module 72 from the ground station via the data communication device 40, for example. However, the terrain following control can be performed without having the predetermined flight path FP. Instead of using the predetermined flight path FP, the navigation target calculation module 72B of the navigation module 72 can generate the navigation target (the target position (the north position and the east position) and the target speed (the north velocity and the east velocity)) based on the control signals derived from the receiver 38 according to the user's operation of the remote control. In this case, the unmanned helicopter 10 can be navigated horizontally according to the user's operation (e.g., horizontal speed control using the control sticks of the remote control) while maintaining the predetermined target altitude relative to the ground GD according to the terrain following control.

In the illustrated embodiment, the maneuver module 74 generates the maneuver target based on the navigation target to smoothly track the navigation target. In other words, in order to realize a smooth behavior of the unmanned helicopter 10, the maneuver module 74 generates a smooth subordinate target (maneuver target) for tracking a rough superordinate target (navigation target) generated by the navigation module 72, and the control module 76 controls the servos 22 to follow the smooth subordinate target. Thus, basically, the unmanned helicopter 10 follows the superordinate target with delay. However, the navigation target is generated using the future position and the elevation for the future position, and thus the delay can be compensated.

Figure 14:
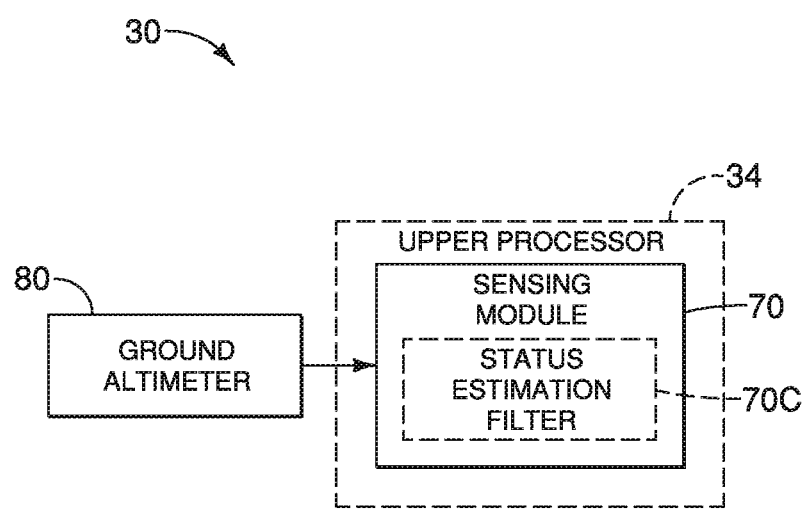
FIG. 14 is a partial block diagram of a flight control system of an unmanned helicopter in accordance with a modification example.

In the illustrated embodiment, as illustrated in FIG. 3, the unmanned helicopter 10 has no ground altimeters. However, as illustrated in FIG. 14, the flight control system 30 of the unmanned helicopter 10 can additionally include a ground altimeter 80 (e.g., a ground altitude detector). In the illustrated embodiment, the ground altimeter 80 detects the altitude of the unmanned helicopter 10 relative to the ground GD using at least one of radar and lidar. As illustrated in FIG. 14, the ground altimeter 80 outputs the detected altitude to the sensing module 70 (e.g., the status estimation filter 70C). With this configuration, even if the DEM data or GPS data becomes unavailable, the unmanned helicopter 10 can be properly navigated using the ground altimeter 80. For example, when the DEM data stored in the computer memory 42 is not matched with an actual terrain of the ground GD, when the DEM data cannot be read from the computer memory 42 (i.e., the DEM data or the computer memory 42 is damaged), or when the unmanned helicopter 10 is flying outside the area for which the DEM data is prepared, the flight control system 30 determines that the DEM data is unavailable. Also, when the accuracy of the GPS data from the RTK-GPS sensor 58 or the single GPS sensor 60 becomes low, and thus the accuracy of the altitude value Qz (the DEM altitude) cannot be ensured, the flight control system 30 determines that the GPS data is unavailable. In this case, the data communication device 40 notifies the operator in the ground station of the status of the unmanned helicopter 10 using the downlink, and the flight control system 30 controls the flight of the unmanned helicopter 10 in the following manner.

If the DEM data or GPS data becomes unavailable while the unmanned helicopter 10 is flying under the terrain following control (i.e., normal operation), then the upper processor 34 determines whether the ground altimeter 80 is available. If the ground altimeter 80 is available, then the flight control system 30 (i) switches a control mode of the unmanned helicopter 10 to a terrain following control using the ground altimeter 80 and increases the predetermined target altitude Sz by a predetermined value (e.g., an extra margin of 5 meters), and (ii) stops the program flight (i.e., the autonomous control). On the other hand, if the ground altimeter 80 is not available, then the flight control system 30 (i) controls the unmanned helicopter 10 to ascend at a predetermined speed for a predetermined period of time (e.g., ascending at 1 m/s for 3 seconds), and (ii) stops the program flight (i.e., the autonomous control).

On the other hand, if the DEM data or GPS data becomes unavailable while the unmanned helicopter 10 is flying under an automatic return control during the link loss procedure in which the program flight cannot be stopped, then the upper processor 34 determines whether the ground altimeter 80 is available. If the ground altimeter 80 is available, then the flight control system 30 (i) switches a control mode of the unmanned helicopter 10 to a terrain following control using the ground altimeter 80 and increases the predetermined target altitude Sz by a predetermined value (e.g., a larger extra margin for the automatic return control than that of the normal operation), and (ii) continues the automatic return control. On the other hand, if the ground altimeter 80 is not available, then the flight control system 30 (i) controls the unmanned helicopter 10 to ascend at a predetermined speed for a predetermined period of time (e.g., ascending at 1 m/s for 3 seconds), (ii) stops the automatic return control, and (iii) restarts the automatic return control after ascending to a predetermined altitude, which is set by the operator according to the prescribed flight area FA. Thus, in the illustrated embodiment, the terrain following control can be performed while performing the automatic return control during the link loss procedure.

In the illustrated embodiment, the predetermined target altitude Sz is preset. However, the predetermined target altitude Sz can be changed according to the accuracy of the GPS data. With the terrain following control using the DEM data, the accuracy of the position in the GPS data greatly affects the accuracy of the altitude value Qz (the DEM altitude) for the terrain following control. When the unmanned helicopter 10 is flying at a low altitude during the terrain following control, higher accuracy of the GPS data is required. Thus, in the illustrated embodiment, if the RTK link loss occurs and the accuracy of the GPS data (e.g., the GPS data from the RTK GPS sensor 58) is lowered, then the terrain following control using the DEM data can be stopped. On the other hand, when the predetermined target altitude Sz is set to a high altitude (e.g., 50 meters or more, which exceeds the measurement range of the ground altimeter, etc.), then the terrain following control using the DEM data can be performed even if the accuracy of the GPS data is low. Thus, with the terrain following control using the DEM data, the predetermined target altitude Sz can be limited or changed according to the accuracy of the GPS data.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to an unmanned helicopter on a horizontal surface.

While only a selected embodiment has been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. An aircraft comprising:
    at least one sensor configured to detect altitude of the aircraft, current position of the aircraft, attitude of the aircraft and speed of the aircraft;
    an altitude actuator configured to change the altitude of the aircraft;
    a memory device configured to pre-store predetermined terrain data of an area prior to starting of a flight of the aircraft over the area; and
    an electronic controller configured to determine a current flight status of the aircraft from among a hovering state, a turning state and a traveling straight state based on a detected attitude of the aircraft and a detected speed of the aircraft,
    the electronic controller being further configured to estimate a future position of the aircraft in different manners according to a determined current flight status of the aircraft based on a detected current position of the aircraft, the detected attitude of the aircraft, the detected speed of the aircraft and the determined current flight status of the aircraft,
    the electronic controller being further configured to control the altitude actuator based on the future position, a detected altitude of the aircraft and the predetermined terrain data.

2. The aircraft according to claim 1, wherein the at least one sensor includes a GPS sensor.

3. The aircraft according to claim 1, wherein the electronic controller is further configured to estimate the future position further based on direction of the aircraft.

4. The aircraft according to claim 1, wherein the electronic controller is further configured to determine the predetermined terrain data for the future position.

5. The aircraft according to claim 4, wherein the electronic controller is further configured to control the altitude actuator based on difference between the detected altitude and the predetermined terrain data for the future position.

6. The aircraft according to claim 1, wherein the electronic controller is further configured to maintain a target altitude over uneven terrain of the area.

7. The aircraft according to claim 1, further comprising a wireless communication device configured to receive manual control command signals.

8. The aircraft according to claim 1, further comprising a ground altitude detector configured to detect the altitude of the aircraft using at least one of radar and lidar.

9. The aircraft according to claim 1, further comprising at least one crop dusting tank.

10. The aircraft according to claim 1, wherein the electronic controller is further configured to control the altitude actuator to fly along a flight path of the aircraft that includes a starting point and an ending point for each pass over a crop in the area without a waypoint between the starting and ending points.

11. The aircraft according to claim 1, wherein the predetermined terrain data includes digital elevation model.

12. The aircraft according to claim 1, wherein the aircraft includes a helicopter.

13. The aircraft according to claim 1, wherein the aircraft includes an unmanned aircraft.

14. An aircraft altitude controlling method comprising:
    pre-storing predetermined data of an area prior to starting of a flight of an aircraft over the area;
    detecting altitude of the aircraft, current position of the aircraft, attitude of the aircraft and speed of the aircraft;
    determining a current flight status of the aircraft from among a hovering state, a turning state and a traveling straight state based on a detected attitude of the aircraft and a detected speed of the aircraft;
    estimating a future position of the aircraft in different manners according to a determined current flight status of the aircraft based on a detected current position of the aircraft, the detected attitude of the aircraft, the detected speed of the aircraft and the determined current flight status of the aircraft; and
    controlling the altitude of the aircraft based on the future position, a detected altitude of the aircraft and the predetermined terrain data of the area.

* * * * *